United States Patent
Peleska et al.

(10) Patent No.: US 11,833,940 B2
(45) Date of Patent: Dec. 5, 2023

(54) CHILD SEAT WITH IMPACT SHIELD FOR ATTACHING TO A MOTOR VEHICLE SEAT

(71) Applicant: CYBEX GmbH, Bayreuth (DE)

(72) Inventors: Franz Peleska, Vienna (AT); Martin Kreis, Bayreuth (DE)

(73) Assignee: CYBEX GmbH, Bayreuth (DE)

(*) Notice: Subject to any disclaimer, the term of this patent is extended or adjusted under 35 U.S.C. 154(b) by 0 days.

(21) Appl. No.: 17/052,104

(22) PCT Filed: Apr. 26, 2019

(86) PCT No.: PCT/EP2019/060819
§ 371 (c)(1),
(2) Date: Oct. 30, 2020

(87) PCT Pub. No.: WO2019/211206
PCT Pub. Date: Nov. 7, 2019

(65) Prior Publication Data
US 2021/0229578 A1    Jul. 29, 2021

(30) Foreign Application Priority Data

May 2, 2018   (DE) .................... 20 2018 102 435.3

(51) Int. Cl.
*B60N 2/28*        (2006.01)
(52) U.S. Cl.
CPC ......... *B60N 2/2884* (2013.01); *B60N 2/2851* (2013.01); *B60N 2/2872* (2013.01)
(58) Field of Classification Search
CPC ....... B60N 2/2884; B60N 2/90; B60N 2/2872
See application file for complete search history.

(56) References Cited

U.S. PATENT DOCUMENTS

| | | | |
|---|---|---|---|
| 4,376,551 A * | 3/1983 | Cone | 297/256.13 |
| 4,580,842 A * | 4/1986 | Segal | D6/333 |
| 4,655,506 A | 4/1987 | Wise et al. | |
| 5,275,464 A | 1/1994 | Eichhorn et al. | |

(Continued)

FOREIGN PATENT DOCUMENTS

| | | |
|---|---|---|
| CN | 1689862 A | 11/2005 |
| CN | 101007514 A | 8/2007 |

(Continued)

OTHER PUBLICATIONS

"International Application No. PCT/EP2019/060819, International Search Report and Written Opinion dated Jul. 12, 2019", (dated Jul. 12, 2019), 10 pgs.

(Continued)

*Primary Examiner* — Anthony D Barfield
(74) *Attorney, Agent, or Firm* — Schwegman Lundberg & Woessner, P.A.

(57) ABSTRACT

The invention relates to a child seat for attaching to a motor vehicle seat, comprising an impact shield, wherein the impact shield is prevented from being dismantled from a main body in at least a first configuration and/or in at least a first state of use of the child seat and/or is prevented from being partially or at least fully mounted on a/the main body in at least a second configuration and/or in at least a second state of use of the child seat, and/or wherein possibilities for configuring and/or installing the child seat are dependent on the fastened state of the impact shield.

10 Claims, 8 Drawing Sheets

(56) References Cited

U.S. PATENT DOCUMENTS

| | | | |
|---|---|---|---|
| 5,507,558 A | 4/1996 | Kain | |
| 5,685,604 A | 11/1997 | Kain | |
| 9,028,006 B2 | 5/2015 | Yi et al. | |

FOREIGN PATENT DOCUMENTS

| | | | |
|---|---|---|---|
| CN | 103419688 A | 12/2013 | |
| CN | 104114409 A | 10/2014 | |
| CN | 205498676 U | 8/2016 | |
| CN | 106314221 A | 1/2017 | |
| RU | 2594272 C2 | 8/2016 | |
| WO | WO-2019211206 A1 | 11/2019 | |

OTHER PUBLICATIONS

"International Application No. PCT/EP2019/060819, English Translation of International Preliminary Report on Patentability dated Nov. 12, 2020", (dated Nov. 12, 2020), 9 pgs.

"Chinese Application No. 201980040506.6, First Office Action and Search Report dated Jun. 16, 2022", (dated Jun. 16, 2022), 19 pgs.

"Russian Application No. 2020138625/11, Office Action dated Aug. 3, 2022", (dated Aug. 3, 2022), 9 pgs.

* cited by examiner

CHILD SEAT WITH IMPACT SHIELD FOR ATTACHING TO A MOTOR VEHICLE SEAT

The invention concerns a child seat for attaching to a motor vehicle seat.

Such child seats often have an impact shield that is designed to hold the child, especially in the event of a collision. Such an impact shield is known for example from U.S. Pat. Nos. 5,685,604, 5,275,464 or 5,507,558. Furthermore, it is known from the mentioned publications that the impact shield can be rotated around laterally arranged axes of rotation. The impact shield can still be released on one or both sides, i.e. it can optionally be completely removed.

It is the object of the invention to propose a child seat with an impact shield that can be used in a comparatively safe manner. In particular, the risk of operating errors should at least be reduced.

The above object is solved in particular by a child seat for attaching to a vehicle seat (preferably a motor vehicle seat), wherein the child seat comprises an impact shield. According to a first aspect of the invention, the child seat and impact shield are preferably configured in such a way that the (complete) removal of the impact shield from a main body (of the child seat) is prevented (blocked) in at least one first configuration of the child seat and/or in at least one first state of use of the child seat. According to a second aspect of the invention, which can optionally be combined with the first aspect, the child seat with impact shield is configured such that the partial or at least complete mounting of the impact shield on a main body (of the child seat) is prevented (blocked) at least in a second configuration of the child seat and/or in at least a second state of use of the child seat. According to a third aspect of the invention, which can preferably be combined with the first and/or second aspect, the child seat with impact shield is designed in such a way that the possibilities (structurally or constructively of given options) for configuring the child seat and/or installing the child seat depend on an attachment condition of the impact shield.

According to the invention, safety is improved when using the child seat. According to the first aspect, disassembly of the impact shield from the main body (at least in one or more specific configuration(s) or in one or more specific states of use) can be prevented. In particular, this can prevent the impact shield from being completely removed from the child seat and the child seat from being used without the impact shield (when use is actually required). In a similar way, according to the second aspect, possible misuse and thus safety disadvantages can be avoided or at least made less likely if the child seat is adjusted or used in such a way that an impact shield is not desired (for example, for a comparatively large child, where the motor vehicle seat belt can then optionally be used). The functional connection (implicitly requiring a corresponding structural characteristic) according to the third aspect also improves safety, since the configuration or use of the child seat can only be permitted for states of attachment of the impact shield where such an attachment state is also sensible. For example, the adaptation of the child seat to a comparatively small child can only be permitted if the impact shield is attached to the main body and its use is therefore at least unavoidable.

According to the embodiment, the (complete) disassembly of the impact shield is absolutely prevented (in all configurations and/or states of use). With such an embodiment, the impact shield is therefore positively connected to the main body in any case.

Prevention of disassembly or assembly means in particular that the corresponding assembly/disassembly (at least in the respective configuration or state of use) is impossible (without damaging the child seat) or at least (significantly) more difficult, for example by the fact that disassembly/assembly is only possible after prior actuation of an actuating device, which is, however, difficult to access in the respective configuration or state of use (or in general), e.g. (completely) covered. To prevent assembly or disassembly, at least one corresponding assembly and/or disassembly prevention device may be provided.

A state of attachment of the impact shield is to be understood in particular as the extent to which the impact shield is completely, partially or not at all attached to (or connected to) the main body. A complete fastening is considered to be present in particular if the impact shield is connected to the main body at all the intended fastening points (e.g. on both sides) (consistently, in particular non-positively and/or positively, or retaining). A partial state of attachment is present if the impact shield is connected to the main body at at least one point, but not at all the points provided for (consistently, in particular non-positively and/or positively, or retaining). In particular, the impact shield is not fastened at all if it is not connected to the main body (directly or indirectly; consistently, in particular positively or non-positively, or retaining), or if optionally it only touches the main body or is at a distance therefrom.

Absolute prevention of disassembly preferably means that disassembly is not possible (or only by destroying the child seat), regardless of how the child seat is configured or used.

A child seat configuration means in particular an adjustment of the child seat with regard to its use, in particular with regard to the size of the child. Specifically, the configuration can be a pivoting and/or translational displacement (movement) of a part supporting the child (e.g. seat surface, backrest, headrest, side wall). Specifically, the (first and/or second) configuration may be an orientation of the child seat with respect to a base and/or a configuration, in particular inclination, of a backrest of the child seat and/or a configuration, in particular inclination and/or height adjustment, of a headrest of the child and/or a configuration, in particular pivoting and/or width adjustment and/or height adjustment, of side bolsters of the child seat.

An orientation of the child seat means in particular the rotational position of the child seat about an (at least substantially) vertical axis, for example a forward orientation in which the child (n use) looks in the direction of travel or a rearward orientation in which the child (in use) looks against the direction of travel. Such an orientation can be changed continuously or in discrete steps. In addition to the already mentioned forward and/or backward orientation, it may also be possible to orientate the child perpendicular to the direction of travel (to make it easier for the child to get in and out of the car). In total, the child seat can optionally be rotated in relation to a base, for example, by leaving the child seat on the base but rotating it in relation to the base by means of a rotating mechanism and/or by removing the child seat from the base, rotating it and remounting it on the base in another orientation.

The backrest inclination can also be adjusted continuously or in discrete steps, if necessary, over an angle range of at least 10°, for example.

The inclination of the headrest (in relation to the backrest or a horizontal defined by a position of use of the child seat) can be varied over a range of at least 10° if necessary. The height of the headrest and/or the side bolsters of the child seat can be varied, if necessary, especially over a range of at least 5 cm, preferably at least 10 cm.

A (first or second) state of use means in particular a state of the child seat in relation to any external elements/devices, in particular in relation to a child and/or a vehicle (in particular its vehicle seat) and/or a (possibly external) child seat base. At this point it should be noted that, in principle, a possibly provided base (even if it can be removed from the child seat) can be regarded as a component of the child seat or as a separate element for mounting the child seat.

In particular, the respective (first and/or second) state of use can be a state with the child in the child seat or a state without the child in the child seat. Furthermore, the respective (first and/or second) state of use may be a state in which a rear side and/or underside of the child seat is/are accessible or a state in which the rear side and/or underside of the child seat is/are not accessible. Furthermore, the respective (first and/or second) state of use may be a state in which the child seat is placed on a base or a state in which the child seat is not placed on a (the) base. Furthermore, the respective (first and/or second) state of use may be a state in which the child seat is placed on a vehicle seat or a state in which the child seat is not placed on a (the) vehicle seat.

The impact shield can have a transverse section. At its lateral ends, the impact shield (right or left) can be straight or curved, in particular backwards, backwards and downwards or curved downwards (towards the child if the child is placed in a child seat). The impact shield can have a padding and/or optionally a hard and/or dense or non-porous support structure at least in sections. The transverse section may have a (transverse) length which is in particular at least 1.2 times, preferably at least 1.5 times and/or a maximum of 6 times, preferably a maximum of 4 times as great as a height of the impact shield (i.e. in particular its dimensioning in a direction perpendicular to the transverse direction and perpendicular to a thickness direction or perpendicular to a direction facing in the direction of travel). In cross-section, the impact shield (including and/or without padding) can be formed in a C-shaped or U-shaped manner, wherein the C-limbs or U-limbs are optionally at most 0.8 times, preferably at most 0.6 times as long as a section (transverse section) of the impact shield connecting the C-limbs or U-limbs. The padding may, where appropriate, include a hollow structure, for example formed by a foam and/or filler material and/or a honeycomb and/or cellular structure. The impact shield may also include an airbag or parts of an airbag system. Airbag or parts of the airbag system are preferably accommodated in the impact shield and/or attached to the airbag.

Furthermore, the impact shield may have one (or more) belt guide(s), which enable at least one belt (integrated in the child seat or external) to be accommodated and guided accordingly. Alternatively, the impact shield can also be designed without belt guides.

The impact shield can be connected or is connectable to the main body at several places (points or sections) (for example at a right and left end of the impact shield). Preferably, the impact shield can be detached from the main body at each of the several points, but further preferably not at all of the several points at the same time. Preferably, the impact shield (or corresponding connection devices) is (are) configured in such a way that in at least one configuration and/or in at least one state of use it is prevented (constructively) that the impact shield is (completely) detached from the main body at the same time at each of the several points (points).

In a concrete embodiment, the impact shield can be connected (attached) to the main body on a right and left side of its transverse section, but cannot be detached simultaneously from both the right and left side.

At each of the several points (or points at which the impact shield can be connected or is connected to the main body) a locking device, in particular comprising (in each case) a locking device (e.g. latch) and/or an actuating device (e.g. actuating button and/or slider) for locking and/or unlocking the assembly of the impact shield at the respective point, can be provided.

The locking device may include a belt tongue and/or a belt buckle. Furthermore, the locking device can include a latch or pin which engages, for example, in holes and/or recesses of a counter-structure. Alternatively or additionally, the locking device can include an element that engages, for example, in a rack. Preferably, a movable element (locking element) is provided which is movable between a locking position and a released position. In addition, a release mechanism may be provided at each (fastening) point, e.g. on each side, comprising for example a button and/or a slider and/or the like.

Basically, it is preferable that all connections (fastenings) are detachable at all positions (points), but preferably not all at the same time.

In embodiments, the child seat may comprise a main body and an impact shield, wherein the impact shield comprises (at least) one (optionally: two) attachment belt(s) with (each) at least one (or two) belt tongue(s) which interact(s) with a belt buckle (each) on the main body. In particular, between the (two) belt buckles there is a coupling device (optionally fixed in sections or at least substantially rigid; preferably not straight or guided around a receiving space for the child), in particular a clamp (specifically designed as a rod), which can assume two positions. In a first position one belt tongue can be in operative connection (cooperation, in particular engagement) with the associated belt buckle. In a second position the other belt tongue can be in operative connection (cooperation, in particular engagement) with the corresponding belt buckle. The belt tongues can each have a recess (hole). Changing the coupling device (clamp) from the first to the second position (or back) is preferably (only) possible if both belt tongues are in cooperation with the respective belt buckles. The child seat preferably has a mechanism or actuator (especially a manually operated one), e.g. a switch or button or slider, wherein a rotary switch can specifically be provided. Furthermore, each belt buckle can have an unlocking mechanism by which the belt tongue and belt buckle can be released from each other.

The release mechanism may include a push button (or other manually operated device), which may be colored red. To prevent the user from perceiving the red signal color on the locked side as a prompt to unlock (although unlocking may be prevented anyway), a cover may be provided for the unlocking mechanism of the locked side, wherein said cover can be (manually) put on or automatically when the rotary switch is turned. In the case of an automatic cover, the release mechanism (release button or push button) on the opposite side can be made accessible again at the same time (also automatically, if necessary).

Furthermore, each belt buckle can have a locking device (locking element) which prevents the corresponding end of the coupling device from entering a receiving space of the belt buckle (to cooperate with the recess/hole of the belt tongue) if there is no belt tongue in the belt buckle. This locking device can be moved (e.g. shifted or rotated) from a locked position to an unlocked position, optionally by penetration of the belt tongue into the receiving space of the belt buckle, so that a path for the end of the coupling device becomes free. The locking device can be spring-loaded and/or return to the locked position when the belt tongue is removed from the belt buckle.

The locking devices, in particular their arresting devices and/or actuating devices, of at least two of the plurality of points are preferably in operative connection with one another, for example mechanically and/or electrically (electronically), in particular in such a way that unlocking of the first of the at least two locking devices is only possible if a second of the at least two locking devices is in a locking state.

Specifically, a mechanical connection can be made via a rigid or a flexible element, such as a linkage or cable (Bowden cable). A mechanical (active) connection can be located in the main body of the child seat and/or in the impact shield.

A release of a fastening (connection) at a first point (in particular on a first side) leads preferably via the active connection to the fact that the release of the fastening at a second point (in particular on the second side) is blocked, in particular (exactly) unto a new fastening at the first point (the first side).

A release of the fastening (connection) at a second point (on the second side) preferably via the (active) connection leads to the fact that a release of the fastening (connection) at the first point (on the first side) is blocked, in particular (exactly) until the (renewed) fastening at the second point (on the second side).

In a preferred embodiment, blocking means may be present at several points (especially on both sides), which are assigned to fastening devices (fastening mechanisms) at their respective position (on their respective side). Each blocking means is preferably movable between a release position, in which it does not block the release of the associated fastening, and a blocking position, in which it can block the release of the associated fastening (as an option).

The several (both) blocking means can be connected to each other via the (active) connection, preferably in such a way that there is always exactly one blocking means in the blocking position and at least one other (the other) blocking means in the release position. Preferably, both blocking means can never be in the blocking position or both blocking means in the release position. A transfer of one blocking means is preferably inevitably accompanied by the transfer of the other blocking means. The transfer of the respective blocking means should take place exactly when (and preferably only when) the fastening devices (fastening mechanisms) are closed on both sides and a release is initiated on that side (or generally: at that point) where the respective blocking means is in the blocking position. The transfer of the blocking means can be effected (optionally directly) by actuating the release mechanism or by transferring the locking device (the locking element) of the locking device (of the fastening mechanism) to the released position. Further preferably the locking element (arresting device) in turn blocks a transfer of the blocking means in its released position.

Altogether several states are conceivable. According to a first state, at a first point (first side) a fastening can be released and the blocking means can be in release position and at a second point (second side) the fastening can be closed and the blocking means can be in blocking position, wherein the blocking means cannot be transferred. According to a second state, at a first point (first side) the fastening can be closed and the blocking means can be in blocking position and at a second point (second side) the fastening can be closed and the blocking means can be in release position, wherein the blocking means can be transferred. Reciprocal states thereto (in which the first position/side is swapped with the second in the preceding) are also conceivable.

As an alternative or in addition to a mechanical (active) connection, an electrical connection (wireless or wired), optionally with sensors to detect a fastening, can be provided. A movement/actuation of blocking means can then be carried out, for example, via electromagnets and/or electric motors or similar. In such an embodiment, further components, such as an energy storage unit and/or a connection for a power supply, a memory unit for storing program code, a processor and/or sensors, if necessary, can also be used to enable the control of electric drives (motors) and/or electromagnets.

In a further embodiment, a non-releasable connecting device (in particular one which cannot be released under any circumstances), for example comprising a cord and/or a rope and/or a chain and/or a band and/or a belt, may be provided between the impact shield and the main body. The connecting device shall preferably be designed in such a way that in the state of use of the impact shield, the impact shield at least does not absorb any significant forces (e.g. in the event of an impact) or at least essentially has no function of holding (restraining) the child. Optionally, the connecting device can also have a restraining function, for example by at least (or exclusively) preventing so-called submarining (supping under the impact shield). In particular, the connecting device can be designed in such a way that in a state in which the child is accommodated in the child seat and is held (fixed) by the impact shield it is not under any pressure and; or tension, but hangs down loosely, for example. The (non-releasable) connecting device may be functionally similar to a binding strap for a ski. The (non-releasable) connecting device can be flexible and/or formed in a non-rigid manner. The (non-releasable) connecting device can be located (attached) with a first end on a front side (facing away from the child) or back side (facing the child) or underside of the impact shield. Furthermore, the (non-releasable) connecting device may be attached with a second end to a seat part of the child seat (preferably at a point where a crotch strap is also attached). The (non-releasable) connecting device can have additional functionalities, e.g. the (non-releasable) connecting device can be used to realize further connections in addition to the mechanical connection. These additional connections may include, for example, electrical connections and/or connections to enable a gas flow. In particular, in this way it is possible to control and/or supply gas to an airbag integrated in the airbag body.

In further embodiments, an actuating device may be provided to allow the impact shield to be released, in particular completely. The actuating device shall preferably not be accessible in an installed state of the child seat or shall be located on a rear and/or underside of the child seat. Alternatively or additionally, if the actuating device permits a release of the impact shield and the child seat is not installed and/or no child is sitting in the child seat, an installation of the child seat and/or arrangement of the child in the child seat, in at least one configuration and/or orientation of the child seat, can be prevented (blocked), for example by triggering the actuating device through a handle, e.g. lever, which in this case is in the way and/or by triggering the corresponding mechanism by bringing the seat closer to the backrest, in particular by folding the seat back.

Furthermore, it may be provided that the actuating device (only) permits (in particular complete) release of the impact shield if the child seat, in particular its headrest and/or side bolsters, is adjusted to a size within a predetermined size range.

In general, the possibility of, in particular, complete release of the impact shield and/or the possibility of, in particular, complete assembly of the impact shield may be linked to the child's height adjustment, in particular adjustment of a head restraint and/or side bolsters. Preferably, the impact shield can (only) be detached if a predetermined minimum size is set (wherein the minimum size is larger than a minimum adjustable size). Alternatively or additionally, the impact shield can (only) be mounted if a predetermined maximum size is set (wherein the maximum size is optionally smaller than a maximum adjustable size). The minimum and maximum size may be identical or the minimum size may be smaller than the maximum size, preferably so that the impact shield can be mounted in a freely detachable manner in a height range, wherein the height range is preferably at most 25% and/or at least 5% of the total range available for height adjustment. More preferably, the height range includes an area suitable for children with a height of (approximately) 105 cm and/or a weight of (approximately) 15-18 kg.

Alternatively or in addition, the possibility of adjusting the size of the child seat, in particular adjustment of a headrest and/or side bolsters, may be coupled to a fastening state of the impact shield. In particular, a size which is at or above a predetermined minimum size may be adjustable only when the impact shield is at least partially, in particular completely released and/or a size which is at or below a predetermined minimum size may be possible only when the impact shield is at least partially fastened. A size adjustment, in particular in relation to a headrest and/or in relation to side bolsters, may in particular be understood to mean an adjustment of a distance and/or an angle (e.g. of the headrest and/or side bolsters) from/to a seat surface and/or a backrest.

A backrest may have at least one slot, which preferably comprises two straight sections, optionally (slightly) offset from each other, and a connecting section (extending substantially perpendicularly to the straight sections, in particular at least substantially horizontally). A/the headrest preferably has at least one (specifically two) pin(s) which can move in the associated slot or is guided in it. The pin can preferably have (at least) two positions with respect to a direction perpendicular to the straight sections and/or perpendicular to an axis of symmetry of the headrest. Preferably, a transfer of the pin from one position to the other is only possible in the area of the connecting section.

In particular, the pin transfer can be controlled either directly by a (complete) release/disassembly or (at least partial, possibly complete) assembly of the impact shield. Alternatively or additionally, the pin transfer can be controlled indirectly by a mechanism (in particular a hidden, optionally openly accessible mechanism), for example a button and/or switch and/or slider. A concrete possibility to control the pin can be a linkage.

When the headrest is in its highest position, the pin can be on the outside (shifted outwards in relation to an axis of symmetry of the headrest), wherein a transfer of the pin to another position is not possible. If the headrest is in a middle position, the pin can (still) be on the outside, but can be transferred to the inside. If the headrest is in a middle position, the pin can (now) be located inside (i.e. it can be located closer to the axis of symmetry of the headrest), but (still) be moved outside (away from the axis of symmetry). If the headrest is in its lowest position, the pin can be comparatively far inside (shifted towards the axis of symmetry), but it is not possible to transfer the pin to the position further outside.

There may also be other, lockable headrest positions between the shown headrest positions. Preferably, the headrest can be locked in the positions shown, but this is not mandatory.

Depending on the embodiment, the pin can either be transferred to different positions or not. If the pin transfer is coupled with a (complete) release and/or (at least partial) mounting of the impact shield, this means that a (complete) release and/or (at least partial) mounting of the impact shield is only possible if the pin can be transferred to the other position. In this case, it is preferable to assign the mounted impact shield to the low positions of the headrest and the detached impact shield to the high positions.

A control via the positioning of side bolsters can be carried out analogous to (and/or together with) the control via the height of the headrest. A control over a height of the side bolsters can be carried out by (at least essentially) vertical slots. A control over a width can be carried out by (at least essentially) horizontal slots. A control over a height and width of the side panels can be realized by diagonal slots.

Pin and slot can also be swapped (e.g. the pin can be located at the backrest). The slot can be replaced by another rail device. The pin can be replaced by another sliding device, e.g. by a projection and/or a rod and/or a roller. The sections of the slot may be reversed with respect to the arrangement further inside and further outside.

In some embodiments, an orientation of the child seat relative to a base and/or vehicle seat may be changeable. Preferably, the impact shield cannot be released in every possible orientation, further preferably neither in a forward nor in a backward orientation. Alternatively or in addition, possibilities for adjusting (or changing) the orientation may depend on a fastening condition of the impact shield. Alternatively or additionally, the child seat may be completely detachable from the base, wherein the impact shield is preferably (only) detachable from the child seat remote from the base and/or the child seat cannot be mounted in the rearward orientation on the base when the impact shield is mounted and/or the child seat cannot be mounted in the forward orientation on the base when the impact shield is not mounted.

In specific embodiments, a detachability the impact shield can be enabled (only) in an entry or exit position (e.g. turned 90° to the direction of travel). Alternatively or additionally, only the forward orientation can be achieved from the entry or exit position with the impact shield fastened. Alternatively or additionally, only the backward orientation can be achieved from the entry or exit position when the impact shield is not attached.

If the child seat comprises a base, wherein the child seat can be detached from the base and, for example, reinstalled in either a forward or a rearward orientation, detachability of the impact shield from the main body may be possible (only) if the seat is detached from the base and/or, with the impact shield attached, seating may be possible only in the forward direction from the seat detached from the base and/or, with the impact shield not attached, seating may be possible only in the rearward direction from the seat detached from the base.

The child seat and base can be rotated against each other (without necessarily removing the child seat completely from the base; the child seat is therefore preferably rotatable on the base). The base may have a slot composed of two curves (especially semicircles) that are offset from each other (especially two semicircles with different radii). The two curves (semicircles) are connected to each other (at two connecting sections). The child seat has at least one pin that can move in the slot or is guided in the slot and can basically assume two different positions with respect to a distance from a center point of the semicircles or an axis of rotation. It is preferable to move the pin from one position to the other only at the two positions (or in an area encompassing these positions) where the slot changes its radius (or where the smaller half circle ends and the larger half circle begins). These positions preferably correspond to entry or exit positions, which are in particular rotated by 90° to possible usage positions (in the direction of travel or against the direction of travel).

A transfer of the pin can preferably be controlled either directly by (complete) detaching/removing or (at least partially) mounting the impact shield. Alternatively, it can be controlled indirectly by a (hidden or openly accessible) mechanism, for example a button or switch or slider. An option to control the pin can be a linkage. Preferably in this case, the mounted impact shield should be assigned to a forward orientation of the child seat and the released impact shield to a rearward orientation of the child seat.

Pin and slot can also be swapped (e.g. the pin can be located at the base). The slot can be replaced by another rail device. The pin can be replaced by another sliding device, e.g. by a projection and/or a rod and/or a roller.

In some embodiments, the child seat can be removed from the base and reinstalled rotated through 180° (forward or backward orientation). The base preferably has at least one recess (depression) (specifically two depressions), so that an asymmetry results with respect to the direction of travel. The child seat has at least one protruding element (specifically two protruding elements) on its underside, which can be accommodated by the respective recess when the child seat is attached to the base, provided that the orientation is suitable.

The (respective) projecting element can be moved in such a way that in a first position it allows the child seat to be mounted on the base in a forward direction and in a second position it allows the child seat to be mounted on the base in a rearward direction. A transfer can preferably be translatory (alternatively or additionally rotatory, for example by means of a pivot such as a toggle switch). A transfer of the (respective) protruding element can be controlled either directly by a (complete) detachment/disassembling or (at least partially) mounting of the impact shield. Alternatively, a control can be carried out indirectly via a (concealed or openly accessible) mechanism, such as a button or switch or slider. A suitable option for controlling the (respective) protruding element can be a linkage.

The recess (depression) and the protruding element can also be reversed (e.g. the protruding element can be arranged at the base).

Alternatively or additionally, it is conceivable that instead of the projecting element, the depression (recess) is movable (slidable).

In the context of this invention, the term "child seat" is to be understood as a generic term for "classical" child seats and baby seats. Preferably, however, the child seat of this invention is a (classical) child seat (for larger children, e.g. group I/II and/or III child seat); which has a backrest structurally separated from a seat area, the inclination of which can be optionally varied with respect to the seat area. The structural demarcation may be formed by a kink or similar, in general, however, (unless otherwise stated in the specific context) child seat is always to be understood as an abbreviated form of writing for "child seat, e.g. baby seat" or, in the context of this invention, features intended for a child seat are in principle also applicable to a baby seat and vice versa (unless otherwise stated). The same applies to the term "child", which is also to be understood as a generic term for children and babies and infants. So-called "baby seats" often comprise (only) a one-piece shell to hold the baby or child and may include a separate belt system, optionally a head restraint, and optionally other components. Instead of a (structurally separate) backrest; such "baby seats" have a back section which adjoins a "seat area" in which the child's buttocks can be accommodated.

A child can be secured in a child seat by the car's three-point belt or by a belt provided on the child seat itself (for example, a five-point belt, a chest belt or similar). A belt may be passed over one shoulder of the child in the seat towards an opposite side of the pelvis. However, two belts can also be provided, each of which is guided over one of the shoulders.

Further embodiments result from the subclaims.

In the following, the invention is described by means of exemplary embodiments, which are explained in more detail by means of the illustrations, wherein.

In the following description, the same reference numerals are used for identical and equally effective parts.

An overall mechanism 10 (see FIGS. 1 to 3) allows an impact shield (not shown in FIG. 1) to be secured against a main body on a first side (point) 100 and a second side (point) 200. On the first side 100 a first locking device (first locking mechanism) 101 is provided with a first arresting device 102 comprising a first locking element 111 having a first pin 110 at one end and a first inclined surface 112 at the opposite end. The first pin 110 is engaged with a first counter-structure 130 of the first arresting device 102 (e.g. recess or opening). The first locking element also has a projection which forms a first actuating device (first release mechanism) 113 and with which the first locking element 111 can be brought out of engagement with the first counter-structure 130 against the force of a first spring 114. The movement of the first locking element 111 (due to the actuation of the first release mechanism 130) is blocked by a first blocking means 120 having a third inclined surface 121 which is (exactly) opposite to the first inclined surface 112 of the first locking element 111 and can cooperate with the latter in order to allow movement of the first blocking means 120 in a direction perpendicular to the direction of movement of the first locking element 111 and against the force of a third spring 122.

Figure 1:
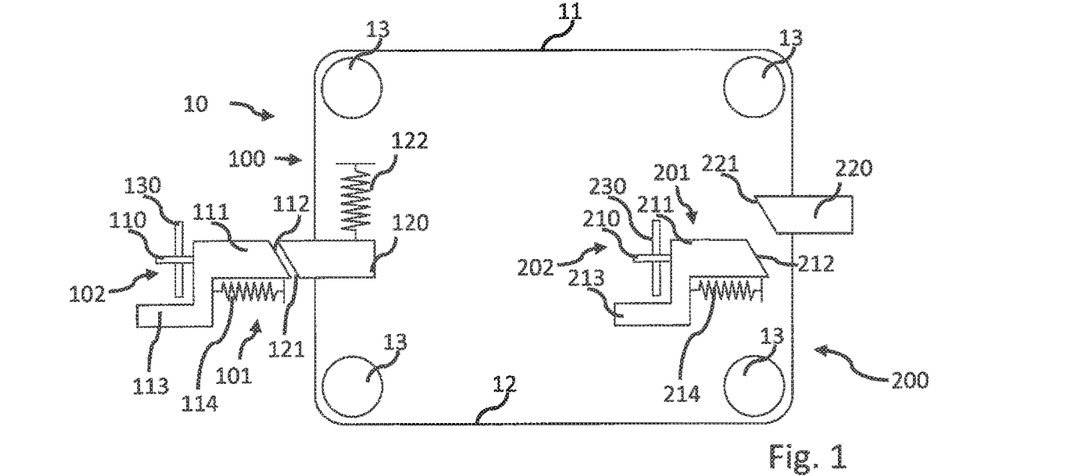
FIG. 1 shows a mechanism according to the invention for fastening an impact shield in a schematic view.

The second side 200 has an almost identical construction with the (only) difference that no spring (corresponding to the third spring 122) is assigned to a second blocking means 220. Specifically, the second side 200 is assigned a second locking device (second locking mechanism) 201, a second arresting device 202, a second pin 210, a second locking element 211, a second inclined surface 212, a second actuating device (second release mechanism; e.g. button) 213, a second spring 214, a second blocking means 220, and a second counter-structure 230. The devices, means and/or elements listed in the previous sentence are preferably designed like the corresponding devices, means and/or elements on the first side 100.

Since no spring is associated with the second blocking means 220, the second blocking means 220 is in a release position with respect to the second locking element 211 (while the first blocking means 120 is in a blocking position with respect to the first locking element 111).

The two blocking means are connected by a first Bowden cable 11 and a second Bowden cable 12 (as examples of corresponding force-transmitting means in general), which are attached to opposite sides of the blocking means 120, 220 in such a way that they transmit a transfer of one (e.g. first) blocking means from its blocking position to its release position to a transfer of the other (e.g. second) blocking means from its release position to its blocking position. Due to the force of the third spring 122, the first blocking means is preferably in its blocking position and the second blocking means in its release position. The Bowden cables 11, 12 can be deflected in a suitable way by rollers 13.

The overall mechanism 10 can be completely integrated into the main body of the child seat, except for the counter-structures 130, 230. The counter-structures 130, 230 can be part of the impact shield and can be designed as belt tongues, for example. The two release mechanisms 113, 213 can have a memory function (not shown). This means that actuation of the respective release mechanism 113, 213 is maintained (without further external action) until the associated counter-structure 130, 230 is reinserted into it after its removal from a corresponding receptacle (e.g. belt buckle).

In the position of the overall mechanism 10 shown in FIG. 1, both sides 100, 200 are locked.

Figure 2:
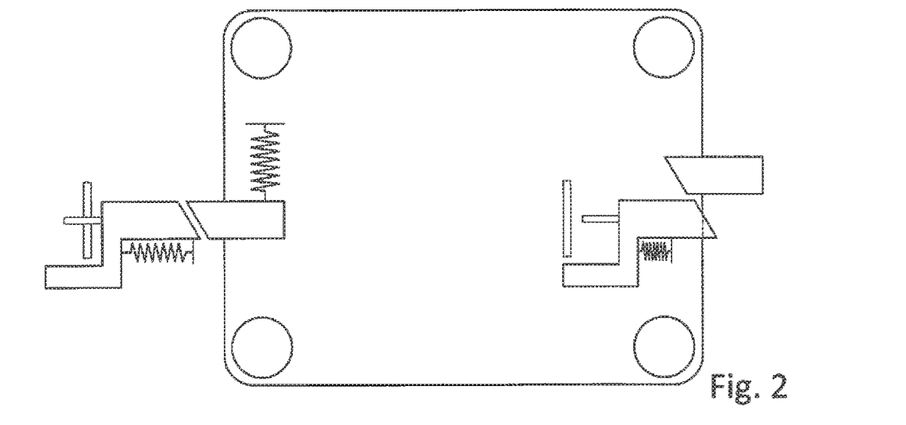
FIG. 2 shows the mechanism according to FIG. 1 in a further position differing from FIG. 1.

The overall mechanism 10 in FIG. 2 is identical to the one in FIG. 1, but now the second actuating device 213 is actuated in such a way that the second pin 210 of the second locking element 211 is disengaged from the second counter-structure 230 against the force of the second spring 214. Notice must be taken that the second locking element 211 now blocks the movement of the second blocking means 220 from its release position to the blocking position. However, due to the two Bowden cables 11, 12, this also prevents the transfer of the first blocking means 120 from its blocking position to its release position, so that the first release mechanism 113 cannot be actuated.

In the position of the overall mechanism 10 shown in FIG. 2, the first side 100 is locked and the second side 200 is not locked.

Figure 3:
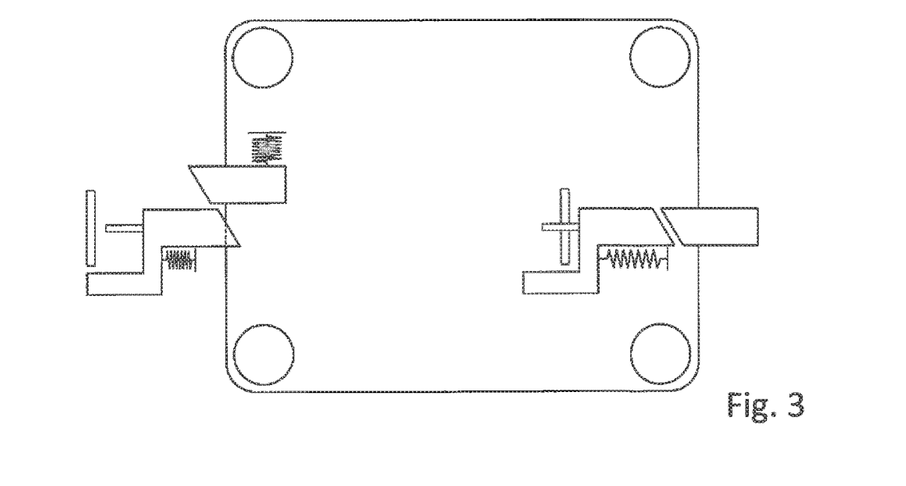
FIG. 3 shows the mechanism according to FIG. 1 in another position.

The overall mechanism 10 in FIG. 3 is identical to that in FIG. 1, except that the first actuating device 113 is now actuated in such a way that the first pin 110 of the first locking element 111 is disengaged from the first counter-structure 130 against the force of the first spring 114. At the same time, the first blocking means 120 was moved from its blocking position to its release position against the force of the third spring 122. Due to the connection of the blocking means 120, 220 by the Bowden cables 11, 12, the second blocking means 220 was also transferred from the release position to the blocking position. Thus, the first locking element 111 now blocks the movement of the first blocking means 120 from its release position into the blocking position and thus also prevents the transfer of the second blocking means 220 from its blocking position back into the release position so that the second release mechanism 113 cannot be actuated.

In the position of the overall mechanism 10 shown in FIG. 3, the first side 100 is not locked and the second side 200 is locked.

Figure 4:
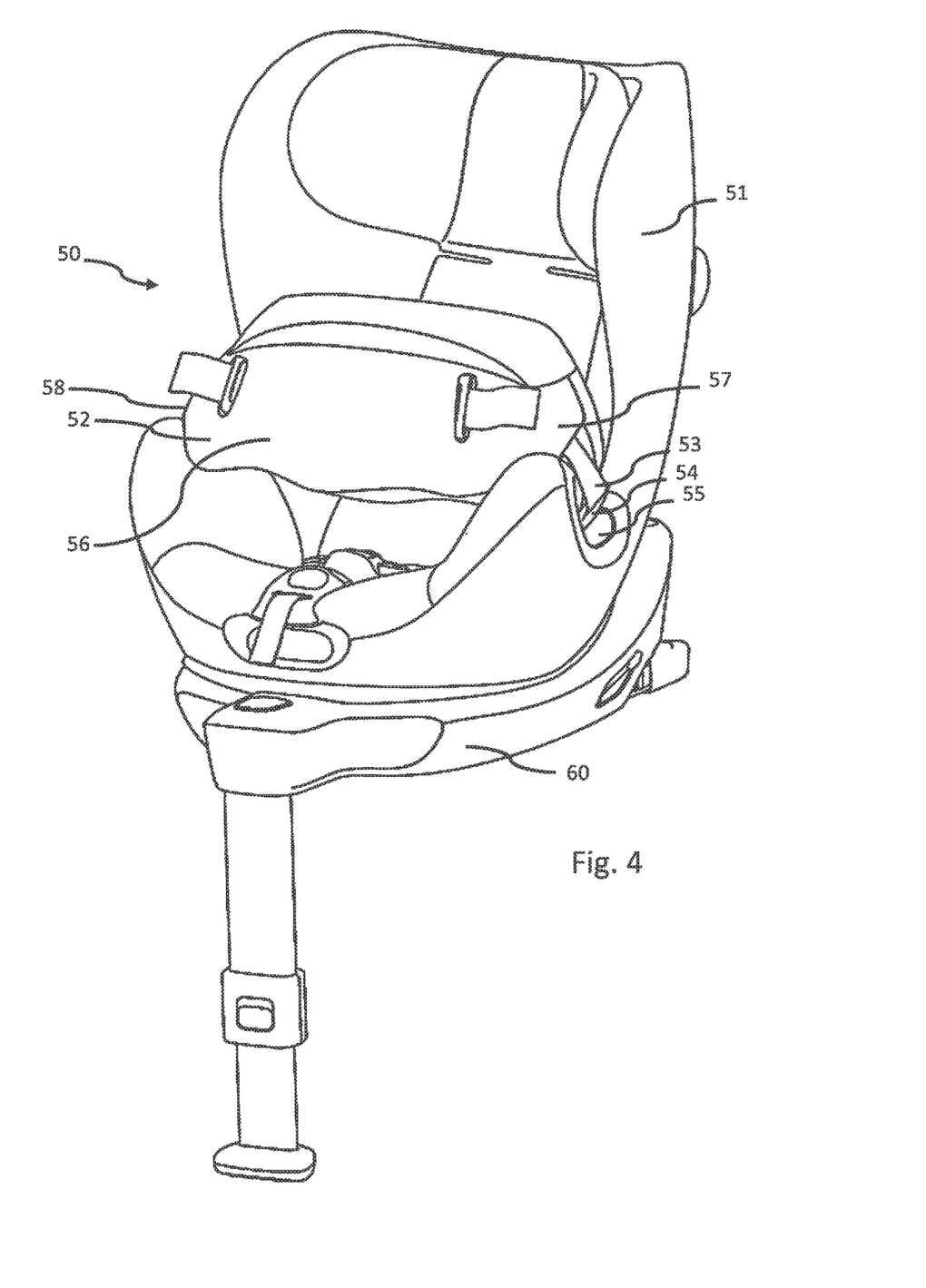
FIG. 4 shows a child seat according to the invention in a diagonal view.
Figure 5:
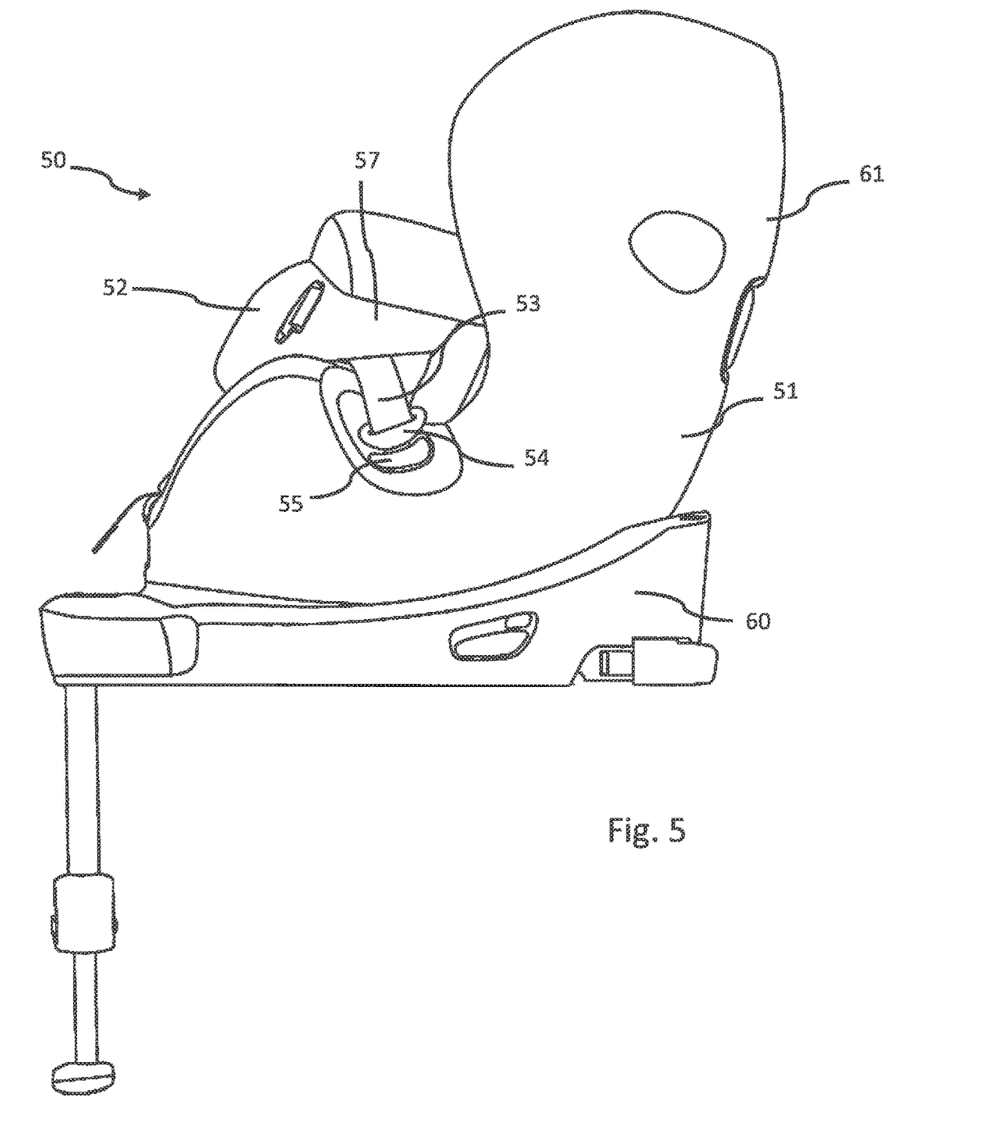
FIG. 5 shows the child seat according to FIG. 4 in a side view.

FIGS. 4 and 5 show a child seat 50 with a main body 51 and an impact shield 52, wherein the impact shield 52 has a transverse section 56 and a first (left) side section 57 and a second (right) side section 58. The impact shield 52 further accommodates a fastening belt 53 which is guided along the transverse section 56 and has a belt tongue 54 on each of the first and second side sections 57, 58 of the impact shield, which can be engaged with an associated belt buckle 55 on the sides of the main body 51. The belt tongues may include the counter-structures 130, 230.

With the seat according to FIGS. 4 and 5, it may be possible to release the impact shield in an entry and exit position and/or rotate it (compared to a base 60) to the front or back. Furthermore, a backrest 61 or the entire seat may be adjustable with regard to its inclination.

Figure 6:
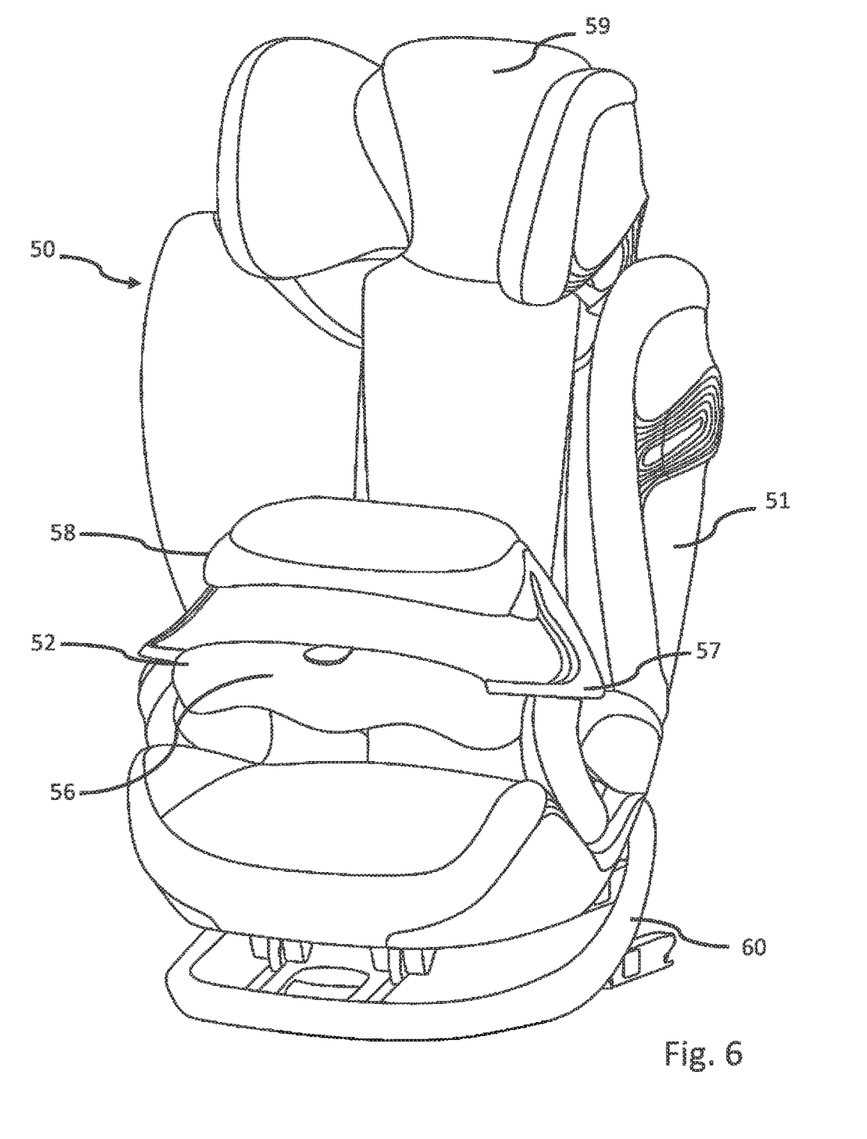
FIG. 6 shows a further embodiment of a child seat according to the invention in inclined view.
Figure 7:
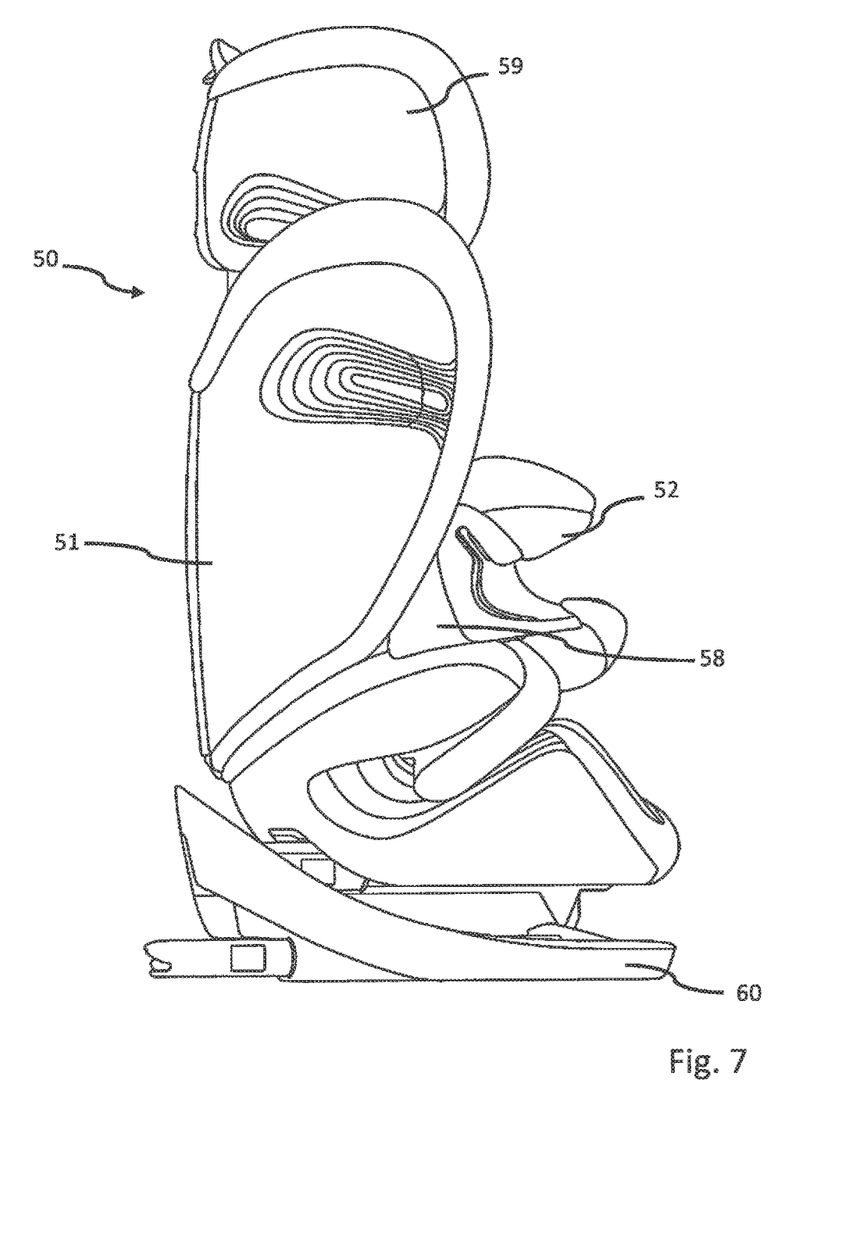
FIG. 7 shows the child seat according to FIG. 6 in a side view.

FIGS. 6 and 7 show a child seat 50 with a main body 51 and an impact shield 52 according to another embodiment. The impact shield 52 has a transverse section 56 and a first (left) side section 57 and a second (right) side section 58. The fastening of the impact shield 52 is not explicitly shown (it can be attached by means of a vehicle belt). The main body 51 includes a height-adjustable headrest 59.

With the seat according to FIGS. 6 and 7, the impact shield may be detachable depending on the headrest position. Even if the specific seat can optionally only be used in forward direction, a coupling of the orientation to the fastening of the impact shield is also conceivable.

Figure 8:
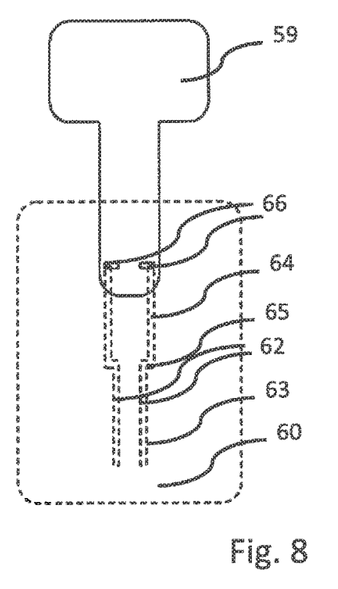
FIG. 8 shows a section of another child seat according to the invention in a first configuration.
Figure 9:
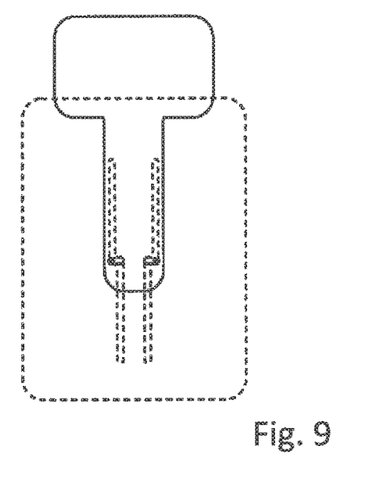
FIG. 9 shows the section according to FIG. 8 in a further configuration.
Figure 10:
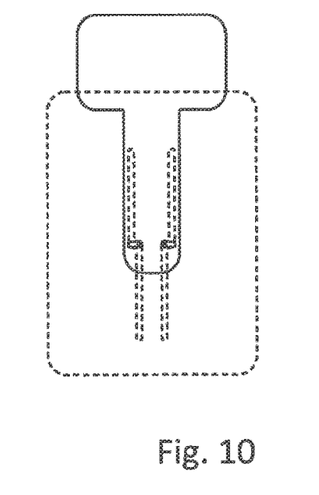
FIG. 10 shows the section according to FIG. 8 in a further configuration.
Figure 11:
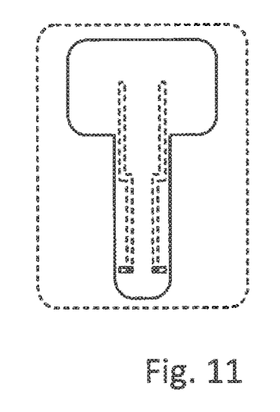
FIG. 11 shows the section according to FIG. 8 in a further configuration.

FIGS. 8 to 11 show schematic sections of a child seat according to the invention in various configurations. The solid lines indicate a headrest 59 and the dashed lines indicate a backrest 61 of the child seat. Headrest 59 and backrest 61 can be moved (in a sliding manner) against each other. The backrest 61 has two slots 62, each of which is composed of two (slightly) offset straight sections 63, 64 and a connecting section 65 (extending essentially perpendicularly to the straight sections 63, 64, in particular at least essentially horizontally). The headrest 59 has two pins 66, which can move in a respectively assigned slot 62 or are guided in this slot. Pin 66 can assume (at least) two positions with respect to a direction perpendicular to the straight sections 63, 64 or perpendicular to an axis of symmetry of the headrest 59 (a first position is shown in FIGS. 8 and 9 and a second position is shown in FIGS. 10 and 11).

FIGS. 8 to 11 show that pin 66 can only be transferred from one position to the other in the area of connecting section 65.

The transfer of pin 66 can be controlled either directly by (completely) loosening/removing or (at least partial, possibly complete) mounting the impact shield (not shown in FIGS. 8 to 11). Alternatively or additionally, it can be controlled indirectly by a (particularly concealed, possibly openly accessible) mechanism, e.g. a button and/or switch and/or slider. A concrete possibility for controlling pin 66 can be a linkage.

FIG. 8 shows the headrest 59 in its highest position. For this purpose, the respective pin 66 must be on the outside (shifted outward with respect to an axis of symmetry of the headrest), wherein a transfer of the respective pin to another position is not possible. In FIG. 9, the headrest 59 is in a middle position, wherein the respective pin 66 is (still) on the outside, but can be transferred to the inside. FIG. 10 shows the headrest in a middle position according to FIG. 9, wherein the respective pin 66 (now) is located inside (i.e. closer to the axis of symmetry of the headrest, but (still) can be moved outside (away from the axis of symmetry). In FIG. 11, the headrest is in its lowest position. For this purpose, the respective pin 66 must be comparatively far inside (shifted in the direction of the axis of symmetry), wherein it is not possible to transfer pin 66 to the position further outside (according to FIG. 8 or 9).

There may also be other, lockable headrest positions between the shown positions of headrest 59. Preferably, the headrest can be locked in the positions shown, but this is not mandatory.

So, depending on the embodiment, a transfer of the respective phi into different positions is either possible or not possible. If the transfer of the pin is coupled with a (complete) release and/or (at least partial) mounting of the impact shield, this means that a (complete) release and/or (at least partial) mounting of the impact shield is only possible if the pin can be transferred to the respective other position.

A control via the positioning of side bolsters can be done analogous to the control via the height of the headrest 59. A control over the height of the side bolsters can be carried out by (at least essentially) vertical slots. A control over a width can be carried out by (at least essentially) horizontal slots. A control over a height and width of the side bolsters can be realized by diagonal slots.

FIGS. 12 to 15 show a further embodiment of a child seat according to the invention in four different configurations. In solid lines, an underside 67 of a child seat is shown, and in dashed lines, an upper side 68 of a corresponding base 60. Child seat 50 and base 60 can be rotated against each other (without the child seat 50 necessarily having to be removed from base 60; the child seat can therefore preferably be rotated on base 60). The base 60 has a slot 69, which is composed of two semicircles that are offset against each other or have different radii. The two semicircles are connected to each other (at two connecting sections). The child seat 50 has a pin 70, which can move in the slot 69 or is guided in it and can basically take up two different positions with respect to the distance to a center of the semicircles or to an axis of rotation.

Figure 12:
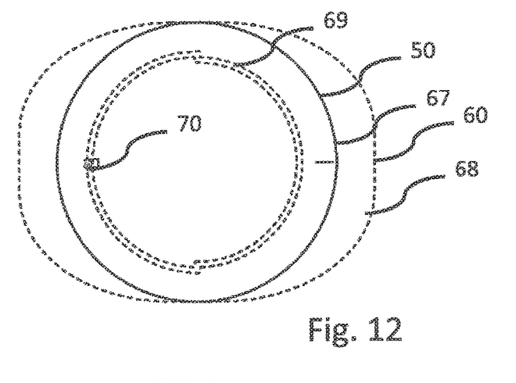
FIG. 12 a section of another child seat according to the invention in a first configuration.
Figure 13:
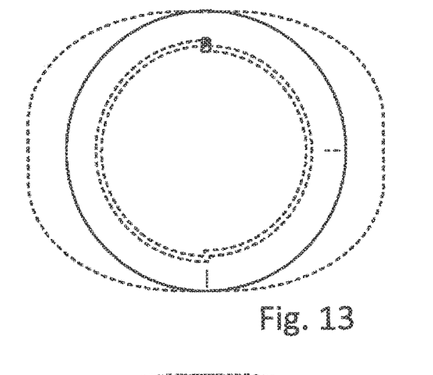
FIG. 13 shows the section according to FIG. 12 in a further configuration.
Figure 14:
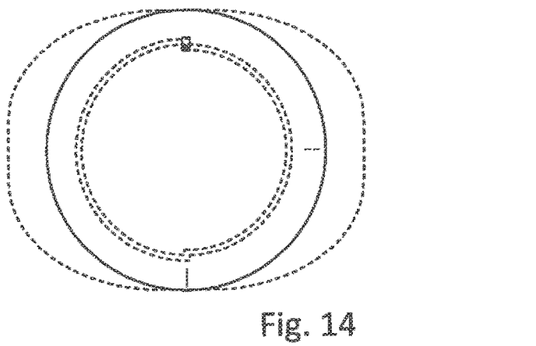
FIG. 14 shows the section according to FIG. 12 in a further configuration.
Figure 15:
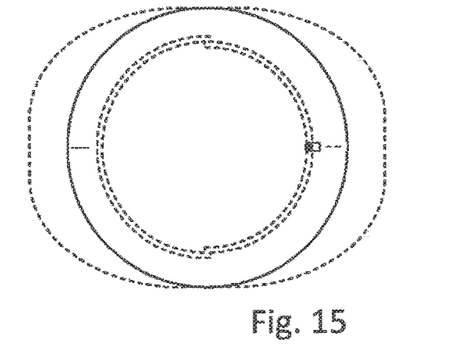
FIG. 15 shows the section according to FIG. 12 in a further configuration.

FIGS. 12 to 15 show that pin 70 can only be transferred from one position to the other at the two points where slot 69 changes its radius (or where the smaller semicircle ends and the larger semicircle begins). These positions correspond to entry or exit positions that are rotated 90° to possible usage positions (in the direction of travel or against the direction of travel). FIGS. 12 and 15 show the two preferred usage positions (forward or backward orientation).

FIGS. 13 and 14 show 90° positions, where the pin is set once to the larger semicircle and once to the smaller semicircle (radius). A transfer of the pin 77 can be controlled either directly by (complete) release/disassembly or (at least partial) mounting of the impact shield. Alternatively, it can be controlled indirectly by a (concealed or openly accessible) mechanism, for example a button or switch or slider. An option to control pin 70 can be a linkage.

Figure 16:
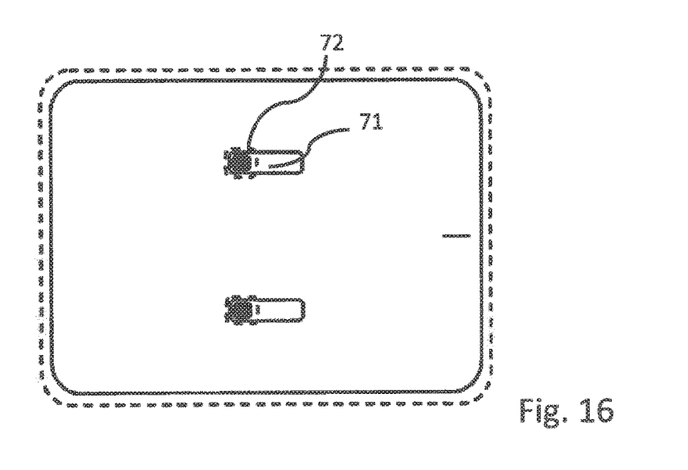
FIG. 16 shows a schematic section of another child seat according to the invention.

FIG. 16 shows a further embodiment of a child seat according to the invention in sections and schematically, wherein an underside 67 of the child seat 50 is shown in solid lines and an upper side 68 of the base 60 is shown in dashed lines, wherein the child seat 50 can be removed from the base 60 and replaced again rotated by 180° (forward or backward orientation).

The base 60 has two recesses 71 in such a way that an asymmetry results with respect to the direction of travel. The child seat 50 has two protruding elements 72 on its underside 67, which can be accommodated by the respective recess 71—assuming a suitable orientation—when the child seat 50 is mounted on the base 60. The (respective) projecting element 72 can be moved in such a way that in a first position it allows the child seat 50 to be mounted on the base 60 in a forward direction and in a second position it allows the child seat 50 to be mounted on the base 60 in a rearward direction. A transfer can preferably be translatory (alternatively or additionally rotationally, for example by means of a pivot such as a toggle switch). A transfer of the (respective) protruding element 72 can be controlled either directly by (complete) release/disassembly or (at least partial) mounting of the impact shield; or control can be carried out indirectly by a (concealed or openly accessible) mechanism, for example a button or switch or slider. A suitable option for controlling the (respective) protruding element 72 can be a linkage.

An interaction with the solution shown in FIGS. 1-3 can be, for example, such that by changing an orientation or configuration (at least) one of the deflection rollers 13 is shifted or displaced so that the Bowden cables have to cover less distance and both sides of the impact shield can be released simultaneously.

Alternatively, the pin and slot or depression and projection element may be reversed in the respective examples. Alternatively or additionally, it is conceivable that the depression (recess) can be moved instead of the projecting element.

FIGS. 17 to 20 show a highly schematic and sectional view of a child seat comprising a main body 51 and an impact shield 52, wherein the impact shield 52 has (at least) one fastening belt 53 with two belt tongues 54 which interact with one belt buckle 55 (each) on the main body 51. In particular, between the two belt buckles 55 there is a coupling device 74 or clamp (specifically designed as a rod), which can assume two positions. In a first position, one (in FIG. 17, left) belt tongue 54 is in operative connection (cooperation, in particular engagement) with the corresponding belt buckle 55. In a second position, the other belt tongue 54 (in FIG. 17, right belt tongue) is in operative connection (cooperation, in particular engagement) with the corresponding belt buckle 55. The belt tongues 54 can each have a recess (hole). Changing the coupling device 74 (clamp) from the first to the second position (or back) is (only) possible if both belt tongues 54 are in operative connection (cooperation, especially engagement) with the respective belt buckles 55. The child seat is equipped with a (manually operated) mechanism, e.g. a switch or button or slider, wherein a rotary switch (as in FIG. 17) may be provided.

Figure 17:
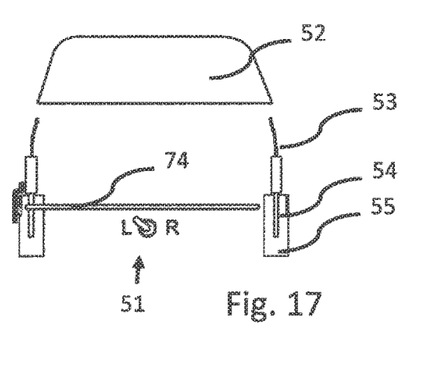
FIG. 17 shows a schematic representation of components of another child seat according to the invention in a first configuration.
Figure 18:
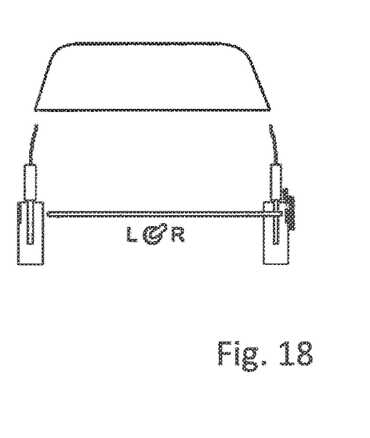
FIG. 18 shows the section according to FIG. 17 in a further configuration.

In addition, each belt buckle 55 can have a release mechanism that allows the belt tongue 54 and belt buckle 55 to be released from each other. The release mechanism can be a push button (or other manually operated device), which may be colored red. To prevent the user from perceiving the red signal color on the locked side as a request to unlock (although unlocking may optionally be prevented anyway), a cover for the release mechanism of the locked side may be provided, which can be put on (manually) or automatically when the rotary switch is turned. In the case of an automatic cover, the release mechanism (release button or push button) on the opposite side can optionally be made accessible again at the same time (also optionally automatically).

Figures 19, 20:
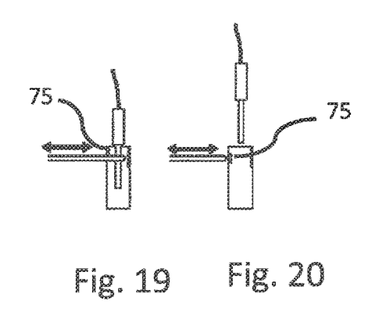
FIG. 19 shows an enlarged view of a section of FIG. 18.
FIG. 20 shows the section according to FIG. 19 in a different configuration.

In FIGS. 19 and 20 it is further shown that each belt buckle 55 has a locking device 75 (locking element) which uses a penetration of the corresponding end of the coupling device 74 into a receiving space of the belt buckle 55 (to cooperate with the recess/hole of the belt tongue 54), so that there is no belt tongue 54 in the belt buckle 55. Optionally, this locking device 75 can be moved away (e.g. shifted or rotated) by penetrating the belt tongue 54 into the receiving space of the belt buckle 55, so that a path for the end of the coupling device 74 becomes free. The locking device 75 may be spring-loaded and/or return to the locked position when the belt tongue 54 is removed from the belt buckle 55.

At this point it should be noted that all of the above described parts are considered to be essential to the invention when viewed on their own and in any combination, especially the details shown in the drawings. Modifications of this are familiar to the person skilled in the art.

LIST OF REFERENCE NUMERALS

10 Overall mechanism
11 First Bowden cable
12 Second Bowden cable
13 Deflection roller
50 Child seat
51 Main body
52 Impact shield
53 Fastening belt
54 Belt tongue
55 Belt buckle
56 Transverse section
57 First side section
58 Second side section
59 Headrest
60 Base
61 Backrest
62 Slot
63 Straight section
64 Straight section
65 Connecting section
66 Pin
67 Underside
68 Upper side
69 Slot
70 Pin
71 Recess
72 Protruding element
74 Coupling device
75 Locking device
100 First side
101 First locking device
102 First arresting device
110 First pin
111 First locking element
112 First inclined surface
113 First actuating device
114 First spring
120 First blocking means
121 Third inclined surface
122 Third spring
130 First counter-structure
200 Second side
201 Second locking device
202 Second arresting device
210 Second pin
211 Second locking element
212 Second inclined surface
213 Second actuating device
214 Second spring
220 Second blocking means
221 Fourth inclined surface
230 Second counter-structure

What is claimed is:

1. A child seat for attaching to a motor vehicle seat, comprising:
an impact shield, wherein its disassembly from a main body in at least one first configuration or in at least one first state of use of the child seat is prevented; and
wherein a non-releasable connecting device is provided between the impact shield and the main body;
wherein the non-releasable connecting device is flexible and is designed such that it at least does not absorb any significant forces in the state of use of the impact shield or essentially has no child-holding function and wherein the non-releasable connecting device includes an electrical connector or a gas connector.

2. The child seat according to claim 1, wherein disassembly of the impact shield from the main body is prevented in all configurations or states of use.

3. The child seat according to claim 1, wherein the first or second configuration comprise(s):
an orientation of the child seat relative to a base or
an inclination, of a backrest of the child seat or
an inclination or height adjustment, of a headrest of the child seat, or
a height adjustment, of a side bolster of the child seat.

4. The child seat according to claim 1, wherein the first or second state of use comprises:
a state with or without a child in the child seat or
a state in which a rear side or underside of the child seat is accessible or not accessible or a state in which the child seat is arranged on a base or not on the base or
a condition in which the child seat is arranged on a vehicle seat or not on the vehicle seat.

5. The child seat according to claim 1, wherein the possibility of complete release of the impact shield or the possibility of complete mounting of the impact shield is coupled to the size adjustment of a headrest of the child seat or a side bolster of the child seat and wherein the impact shield is only releasable when a predetermined minimum size is set.

6. The child seat according to claim 1, wherein the possibility of size adjustment of an headrest of the child seat or a side bolster of the child seat is coupled to a fastening state of the impact shield.

7. The child seat according to claim 1, wherein an orientation of the child seat relative to a base can be changed, wherein the impact shield is not releasable in every possible orientation, further neither in a forward nor in a rearward orientation, or
- wherein the possibilities for adjusting or changing the orientation depend on a fastening condition of the impact shield or
- wherein the child seat can be completely released from the base, wherein the impact shield can only be released from the child seat which is removed from the base or the child seat cannot be mounted in the rearward orientation on the base when the impact shield is mounted or the child seat cannot be mounted on the base in the forward direction when the impact shield is not mounted.

8. A system comprising a child seat according to claim 1 and a base.

9. A motor vehicle having a child seat according to claim 1.

10. A method for operating a child seat according to claim 1, wherein the child seat is installed on a vehicle seat in in such a way that an actuating device for permitting release of an impact shield is not accessible, or wherein a child is arranged in the child seat in such a way that an actuating device for permitting release of the impact shield is not accessible.

* * * * *